UNITED STATES PATENT OFFICE.

KENNETH P. MONROE, OF WASHINGTON, DISTRICT OF COLUMBIA.

METHOD FOR THE MANUFACTURE OF FURFURAL AND VOLATILE ORGANIC ACIDS FROM EXTRACTED CORNCOB PENTOSAN.

1,357,467.            Specification of Letters Patent.        Patented Nov. 2, 1920.

No Drawing.       Application filed April 8, 1920.  Serial No. 372,352.

(FILED UNDER THE ACT OF MARCH 3, 1883, 22 STAT. L., 625.)

*To all whom it may concern:*

Be it known that I, KENNETH P. MONROE, a citizen of the United States of America, and an employee of the Department of Agriculture of the United States of America, residing in the city of Washington, District of Columbia, (whose post-office address is Department of Agriculture, Washington, D. C.,) have invented a new and useful Method for the Manufacture of Furfural and Volatile Organic Acids from Extracted Corncob Pentosan.

This application is made under the act of March 3, 1883, chapter 143 (22 Stat., 625), and the invention herein described and claimed may be used by the Government of the United States or any of its officers or employees in the prosecution of work for the Government, and any person in the United States, without payment to me of any royalty thereon.

In the practice of my invention, extracted corn-cob pentosan, such as is largely contained in corn-cob adhesive, described in Letters Patent No. 1,285,247, issued to F. B. La Forge, is treated with acid of a suitable concentration, and at a suitable temperature and pressure to produce furfural and volatile organic acids, which are removed from the reaction mixture by distillation, with or without the aid of a current of steam at a suitable temperature and pressure. The aqueous solution of furfural and volatile organic acids which constitutes the distillate is then treated to separate the furfural from water and acids, which may be conveniently accomplished by fractional distillation, preferably by aid of a fractionating column, or by extraction by immiscible solvents. The temperature at which the fractions are taken during the fractional distillation is the boiling point of the mixture from which the furfural is being distilled inasmuch as the distillation is carried out in an open vessel. This temperature varies with the atmospheric pressure and also with the concentration of the mixture from which distillation is carried out. The residual liquid after separation of furfural is further treated to separate the volatile organic acids, which may be accomplished by further fractional distillation, or by neutralizing with any convenient base (such as lime) and by subsequent evaporation to dryness to obtain the salts of the volatile organic acids.

To illustrate:

I take five hundred grams of corn-cob adhesive, prepared according to the process described in Letters Patent No. 1,285,247, and which consists of a concentrated aqueous suspension of gums, rich in pentosan, and thoroughly mix the same in a three-liter round-bottom flask with an aqueous solution of sulfuric acid, prepared by mixing 150 c. c. concentrated sulfuric acid (specific gravity, 1.84) and 500 c. c. water. I then add paraffin in order to prevent foaming during the subsequent heating process, and heat the mixture to boiling. In order to remove the furfural and volatile organic acids as they are produced in the reaction, a vigorous current of steam is passed through the reaction mixture and the vapors are condensed by a water-cooled condenser. The distillate is caught in five 800-c. c. portions. The aqueous solution of furfural and volatile organic acids which constitutes the distillate is then fractionally distilled in a flask provided with a fractionating column, and by proper control of the distillation the greater part of the furfural is obtained in a volume of distillate approximately equal to one-eighth the volume of liquid taken. The furfural phase in the distillate is separated from the supernatant saturated aqueous solution of furfural by means of a separatory funnel, and the aqueous solution is returned to the flask for further fractionation. The combined portions of furfural phase are then fractionally distilled to effect separation of furfural from dissolved water and other impurities.

The following described method of procedure is alternative to the preceding one of fractional distillation.

I treat one portion of the original distillate with sufficient sodium carbonate to neutralize the acids contained therein, then saturate the portion of distillate with common salt and extract with ether in a separatory funnel. After separating the ether phase, which contains the greater portion of the furfural, from the aqueous phase, I evaporate the ether phase in order to separate the ether from the furfural, which latter is purified by fractional distillation.

After separation of furfural by fractional distillation alone, as hereinbefore and first described, I obtain the volatile organic acids by neutralizing the residual liquid with lime and evaporating to dryness.

Having described my invention, I claim:

The process of manufacturing furfural and volatile organic acid from extracted corn cob pentosan consisting in boiling extracted corn cob pentosan with concentrated acid, removing furfural and volatile organic acids from the reaction mixture by distillation, separating from the distillate the furfural and volatile organic acids and the water by fractional distillation and finally neutralizing the volatile organic acids by treatment with an alkali.

In testimony whereof I have signed this specification in the presence of two subscribing witnesses.

KENNETH P. MONROE.

Witnesses:
H. T. PAINE,
F. B. LA FORGE.